US011720408B2

(12) United States Patent
Sivaraman et al.

(10) Patent No.: US 11,720,408 B2
(45) Date of Patent: Aug. 8, 2023

(54) METHOD AND SYSTEM FOR ASSIGNING A VIRTUAL MACHINE IN VIRTUAL GPU ENABLED SYSTEMS

(71) Applicant: VMWARE, INC., Palo Alto, CA (US)

(72) Inventors: Hari Sivaraman, Livermore, CA (US); Uday Pundalik Kurkure, Los Altos Hills, CA (US); Lan Vu, San Jose, CA (US); Anshuj Garg, Jabalpur (IN)

(73) Assignee: VMWARE, INC., Palo Alto, CA (US)

( * ) Notice: Subject to any disclaimer, the term of this patent is extended or adjusted under 35 U.S.C. 154(b) by 308 days.

(21) Appl. No.: 16/392,668

(22) Filed: Apr. 24, 2019

(65) Prior Publication Data

US 2019/0347137 A1  Nov. 14, 2019

Related U.S. Application Data

(60) Provisional application No. 62/668,470, filed on May 8, 2018.

(30) Foreign Application Priority Data

Jan. 24, 2019  (IN) .............................. 201944003007

(51) Int. Cl.
*G06F 9/50* (2006.01)
*G06F 9/455* (2018.01)
(Continued)

(52) U.S. Cl.
CPC ........ *G06F 9/5044* (2013.01); *G06F 9/45558* (2013.01); *G06F 17/15* (2013.01);
(Continued)

(58) Field of Classification Search
CPC .... G06F 9/5044; G06F 9/45558; G06F 17/15; G06F 2009/4557; G06N 20/00; G06T 1/20

See application file for complete search history.

(56) References Cited

U.S. PATENT DOCUMENTS 6,687,257 B1 * 2/2004 Balasubramanian ........................ H04L 47/564
370/429
10,176,550 B1 * 1/2019 Baggerman ............... G06T 1/60
(Continued)

FOREIGN PATENT DOCUMENTS

JP  2012064206 A  3/2012
WO  2018040112 A1  3/2018

OTHER PUBLICATIONS

Chen, Huixiang, et al. "GaaS workload characterization under NUMA architecture for virtualized GPU." 2017 IEEE International Symposium on Performance Analysis of Systems and Software (ISPASS). IEEE, 2017. pp. 65-67 (Year: 2017).*

(Continued)

*Primary Examiner* — Meng Ai T An
*Assistant Examiner* — Willy W Huaracha
(74) *Attorney, Agent, or Firm* — Thomas Horstemeyer, LLP (57) ABSTRACT

Disclosed are aspects of task assignment for systems that include graphics processing units (GPUs) that are virtual GPU (vGPU) enabled. In some examples, an algorithm is determined based on predetermined virtual machine assignment algorithms. The algorithm optimizes for a predetermined cost function. A virtual machine is queued in an arrival queue for assignment. A graphics configuration of a system is determined. The graphics configuration specifies a number of graphics processing units (GPUs) in the system. The system includes a vGPU enabled GPU. The algorithm is selected based on a correlation between the algorithm and the graphics configuration of the system. The virtual machine is assigned to a run queue based on the selected algorithm.

20 Claims, 7 Drawing Sheets

(51) Int. Cl.
*G06T 1/20* (2006.01)
*G06F 17/15* (2006.01)
*G06N 20/00* (2019.01)

(52) U.S. Cl.
CPC .............. *G06N 20/00* (2019.01); *G06T 1/20* (2013.01); *G06F 2009/4557* (2013.01)

(56) References Cited

U.S. PATENT DOCUMENTS

| | | | | |
|---|---|---|---|---|
| 10,313,665 B2* | 6/2019 | Walkingshaw | ...... | H04N 13/366 |
| 2002/0143599 A1* | 10/2002 | Nourbakhsh | ...... | G06Q 10/0637 |
| | | | | 705/7.31 |
| 2003/0076849 A1* | 4/2003 | Morgan | ................ | H04L 47/805 |
| | | | | 370/412 |
| 2004/0015973 A1* | 1/2004 | Skovira | ................ | G06F 9/4881 |
| | | | | 718/103 |
| 2007/0140467 A1* | 6/2007 | McCormack | .......... | G06Q 10/10 |
| | | | | 379/265.05 |
| 2010/0088706 A1* | 4/2010 | Dong | .................... | G06F 9/4887 |
| | | | | 718/103 |
| 2012/0069032 A1* | 3/2012 | Hansson | ............. | G06F 9/45558 |
| | | | | 718/1 |
| 2012/0192201 A1* | 7/2012 | Sander | ....................... | G06T 1/20 |
| | | | | 718/105 |
| 2014/0176583 A1 | 6/2014 | Abiezzi et al. | | |
| 2014/0237477 A1* | 8/2014 | Cadambi | ............... | G06F 9/5044 |
| | | | | 718/103 |
| 2016/0071481 A1 | 3/2016 | Chakraborty et al. | | |
| 2016/0078585 A1 | 3/2016 | Sheldon et al. | | |
| 2017/0353991 A1* | 12/2017 | Tapia | .................. | H04L 41/0631 |
| 2019/0114202 A1* | 4/2019 | Wang | .................... | G06F 9/5044 |
| 2019/0325554 A1* | 10/2019 | Kelly | .................. | H04N 13/122 |

OTHER PUBLICATIONS

Sivaraman, Hari, Uday Kurkure, and Lan Vu. "Task Assignment in a Virtualized GPU Enabled Cloud." 2018 International Conference on High Performance Computing & Simulation (HPCS). IEEE, 2018.p. 895-900 (Year: 2018).*

Sivaraman, Hari, Uday Kurkure, and Lan Vu. "TECN: Task Selection and Placement in GPU Enabled Clouds Using Neural Networks." 2019 International Conference on High Performance Computing & Simulation (HPCS). IEEE, 2019. pp. 890-896 (Year: 2019).*

Sivaraman et al. "Task Assignment in a Virtualized GPU Enabled Cloud." 2018 International Conference on High Performance Computing & Simulation (HPCS), pp. 895-900 (Year: 2018).*

Lehoczky, John P., and Sandra Ramos-Thuel. "An optimal algorithm for scheduling soft-aperiodic tasks in fixed-priority preemptive systems." RTSS. vol. 92, pp. 110-123. (Year: 1992).*

International Search Report mailed for Application No. PCT/US2019/031350.

* cited by examiner

METHOD AND SYSTEM FOR ASSIGNING A VIRTUAL MACHINE IN VIRTUAL GPU ENABLED SYSTEMS

CROSS-REFERENCE TO RELATED APPLICATIONS

This application claims priority to, and the benefit of, U.S. Provisional Patent Application No. 62/668,470, filed on May 8, 2018, and entitled "Task Assignment in a Virtualized GPU Enabled Cloud," which is incorporated herein by reference in its entirety.

RELATED APPLICATIONS

Benefit is claimed under 35 U.S.C. 119(a)-(d) to Foreign Application Serial No. 201944003007 filed in India entitled "TASK ASSIGNMENT IN VIRTUAL GPU ENABLED SYSTEMS", on Jan. 24, 2019, by VMWARE, INC., which is herein incorporated in its entirety by reference for all purposes.

BACKGROUND

A cluster can include a collection of hosts in which processor, memory, storage, and other hardware resources are aggregated for utilization by the hosts in the cluster. A host is capable of running one or more virtual computing instances, such as virtual machines (VMs). A VM typically includes an operating system (OS) running one or more applications to perform a workload. VMs running on a host utilize cluster resources to perform the workloads. However, if a VM is placed on a host with insufficient resources available to meet the resource demands of the VMs, the host becomes overloaded.

In some existing solutions, one or more VMs on an overloaded host can be relocated to a different host in the cluster in an attempt to remediate the overloaded host. A scheduler is utilized in some systems to select a host for placement of VMs and balance the resource utilization among the hosts in the cluster. However, these placement decisions are frequently made based on insufficient information regarding resource demands of the VMs and resource availability of the hosts. This can result in sub-optimal placement of VMs, unbalanced hosts, network saturation, overloading of network links, and/or overall inefficient utilization of available cluster resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to task assignment for systems that include graphics processing units (GPUs) that are virtual GPU (vGPU) enabled. Virtual GPU enabled systems can include data centers and cloud computing services. These systems can perform tasks such as virtual machines (VMs) that can share a single GPU or a set of GPUs in a vGPU enabled architecture. The number of VMs that share the GPUs can be configured manually by a user or automatically by a scheduler. Further, VMs, virtual GPUs, and other tasks can be assigned or re-assigned to GPUs dynamically. This approach can allow tasks/jobs that use GPUs to run in individual VMs for isolation while also sharing resources. As disclosed herein, an efficient and fast solution can be provided for the problem of assigning VMs or tasks to GPUs in cloud environments or environments with multiple servers, each with one or more GPUs.

In some examples, the aspects of the present disclosure can be utilized to determine an algorithm that optimizes for a predetermined cost function. In some aspects, the predetermined cost function can include a geometric mean of GPU utilization and a parameter that is calculated based on virtual machine execution time and virtual machine wait time—for example, a ratio of virtual machine execution time and a sum of the virtual machine execution time and virtual machine wait time.

This can be performed based on simulated and real world results from virtual machine assignments according to a predetermined set of virtual machine assignment algorithms. In some cases, the algorithm is one of the predetermined set, and in other cases, the algorithm is a new algorithm. The new algorithms can be a modified version of at least one of the predetermined virtual machine assignment algorithms. A machine learning technique can be utilized to generate the modification. For example, the machine learning technique can include at least one of: simulated annealing optimization, bin packing optimization, and particle swarm optimization. A virtual machine can be identified. The virtual machine can be one that is queued in an arrival queue. The virtual machine can be associated with a virtual graphics processing unit (vGPU) profile. A graphics configuration of a system can be determined or identified. The graphics configuration can specify a number of graphics processing units (GPUs) in the system. The system can include a vGPU enabled GPU.

The algorithm can be selected for use based on a correlation between the algorithm, and the graphics configuration of the system. The virtual machine can be assigned to a run queue of a vGPU enabled GPU according to the selected algorithm. The run queue can be associated with the vGPU profile. In some examples, the run queue can be an existing run queue in the system. In other examples, no existing run queue matches the vGPU profile, and the run queue can be a new run queue created to match the vGPU profile once the vGPU enabled GPU is identified as supporting the vGPU profile.

Figure 1:
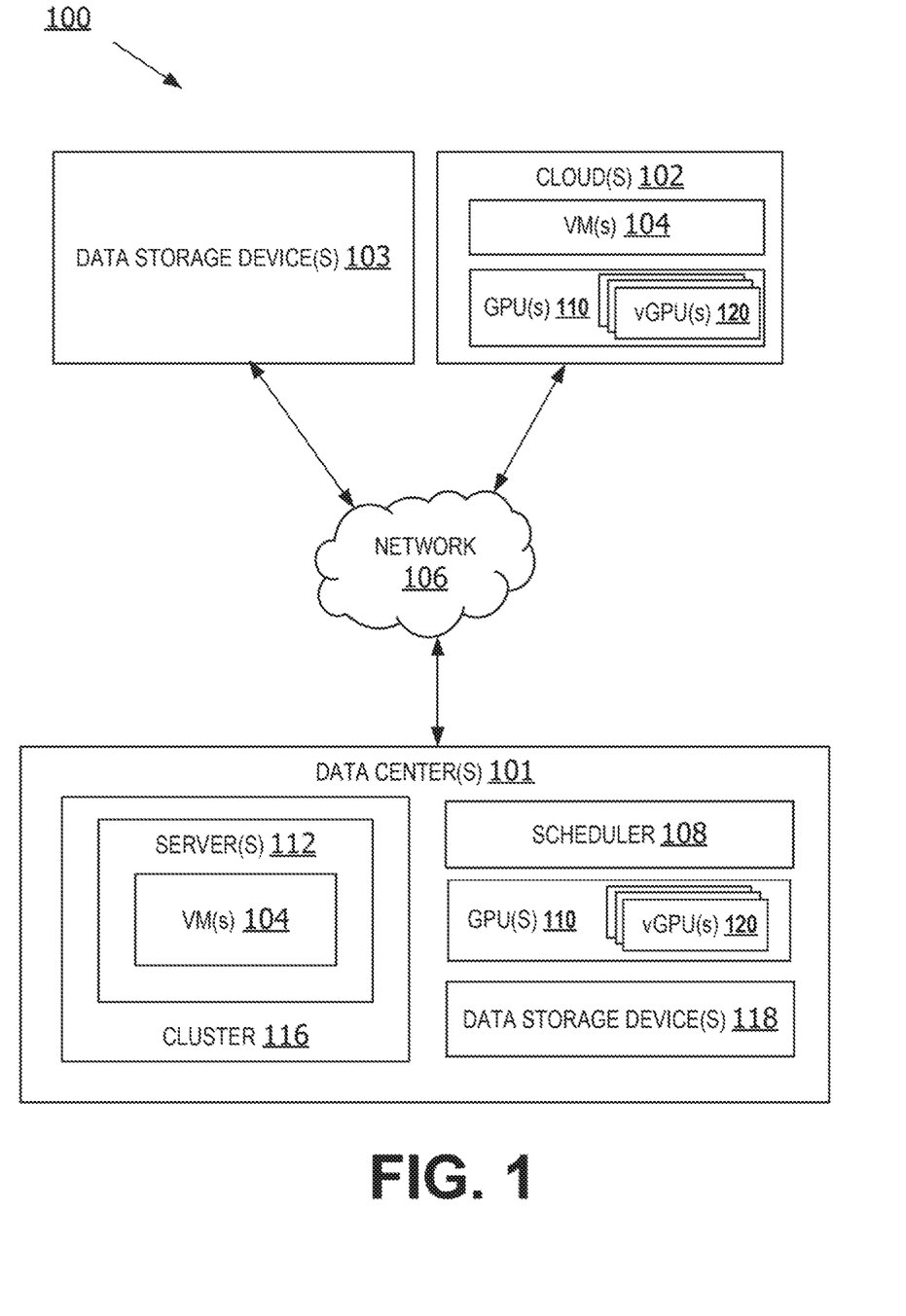
FIG. 1 is a block diagram illustrating an example of a networked environment that includes a data center, a cloud, and a data storage device in communication over a network.

FIG. 1 shows an example networked environment 100 including data center 101, cloud 102, and data storage device 103 in communication over a network 106. Data center(s) 101 can be representative of one or more data centers 101. The networked environment 100 can be utilized to provide optimized task assignment for virtual GPU enabled systems. Data centers 101 can include heterogeneous systems that utilize more than one kind of processor, core, or coprocessor. The data centers 101 can also use multiple instruction-set architectures (ISA).

For example, data centers 101 can include multiple different accelerators, including GPUs 110, field-programmable gate arrays (FPGAs) and application specific integrated circuits (ASICs). A machine such as a host computing device 200 in a data center 101 can have one or more of these accelerators. Assignment of a task or virtual machine to a host can depend on matching the requirements of the task to the available accelerators on the machine. Virtual GPUs can present opportunities to improve resource utilization with the benefit of ease of management. It can allow a large number of virtual machines to share the use of a limited number of physical GPUs in a server 112, cluster 116, data center 101 or cloud 102. In some cases, a task with GPU requirements can be assigned to a vGPU enabled data center 101 or cloud 102. For example, NVIDIA® GPUs and other vGPU enabled GPUs can be supported using a number of different mechanisms.

The data center 101 can execute a task scheduler 108 that is capable of task assignment for virtual GPU enabled systems. For example, the scheduler 108 can assign tasks, including individual ones of the virtual machines 104 to a particular GPU 110. A GPU 110 can include architecture that supports virtual GPUs 120. The virtual machines 104 can be hosted in the data center 101 or cloud 102. The GPU 110 can include hardware provided by the data center 101 or cloud 102.

The data center 101 can include one or more physical computing devices or hosts in the server(s) 112 and data storage device(s) 118. The servers 112 can include a single server, as well as two or more servers in a cluster 116. The cluster 116 can include a group of two or more physical server devices. The server 112 or cluster 116 can include a VMWARE® vSphere. The data center 101 can be equipped with vGPUs 120, which can include NVIDIA® vGPU solution. In some cases, the data center 101 can be considered part of the cloud 102. In other examples, the data center 101 that executes the scheduler 108 can be considered separate from the cloud 102.

The cloud 102 can include a cloud computing platform. For example, the cloud 102 can be implemented as a private cloud, a public cloud, or a hybrid cloud. A hybrid cloud can be a cloud that includes a public cloud and a private cloud. VMWARE® vCloud Hybrid Services (vCHS) can be an example of a hybrid cloud implementation. In some examples, the cloud 102 can run one or more virtual computing instances, such as, but not limited to, individual ones of the virtual machines 104. The virtual machines 104 can utilize virtual GPUs 120 of the data center 101 or the cloud 102. Cloud services associated with the cloud 102 can be provided through a network 106.

The network 106 can include a Wide Area Network (WAN) accessible to the public, such as the Internet. The cloud 102 can be provided through one or more physical servers, as discussed regarding the servers 112 of the data center 101. A virtual machine 104 can include a virtual computing instance, a container, or any other type of virtualized instance. A host can support a virtual machine 104, a virtual computing instance, a container, and/or any other virtualized instance. The servers 112 can include an RSA housing a plurality of physical servers, and one or more blade servers.

The servers 112 can host or execute virtual machines 104. The data storage device(s) 118 can include one or more devices for storing data. The data storage device(s) 118 can be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 118 can include rotational storage, such as a disk. The data storage device(s) 118 can also include non-rotational storage media, such as SSD or flash memory. The data storage device(s) 118 can provide a shared data store that is accessible by two or more physical hosts in the cluster 116. The networked environment 100 can include a remote data storage device, such as data storage device 103. The remote data storage device 103 is accessible by the set of servers 112 through the network 106. Networking resources can include on-host and off-host components. The on-host components can include physical network interface controller (NIC). The off-host components can include a switch and rack.

The virtual machines 104 in the cluster 116 can include highly diverse resource requirements along central processing unit (CPU), memory, and input/output (I/O) dimensions. Existing schedulers can result in sub-optimal virtual machine placements for virtual GPU-enabled systems, causing host network saturation and overloading of network links in core/aggregation level. A distributed resource scheduler (DRS) can include a scheduler 108 for managing virtual GPU enabled resources in a cluster, such as CPU, memory and storage.

The scheduler 108 can include a network-aware and virtual GPU-aware distributed resource scheduler. The scheduler 108 can execute on one or more computing devices associated with the data center 101, such as a server in the set of servers 112. In other examples, the scheduler 108 can execute in the cloud 102.

The scheduler 108 can optimize assignment of a task to a particular GPU 110 that includes or supports virtual GPUs 120. While some examples provided in the present disclosure refer to assignment of virtual machines 104, the scheduler 108 can also assign other types of tasks. For example, a task can include a group of virtual machines, a virtual machine, an application, or a thread. The scheduler 108 can simulate assignment of tasks within a particular graphics configuration that includes, for example, a particular number of GPUs, to generate an optimized assignment algorithm. The optimized algorithm can be correlated with the graphics configuration.

In addition to management of virtual GPUs, the scheduler 108 can manage dynamic entitlement. Entitlement can be a function of the virtual machines actual resource demands, overall cluster capacity, and the virtual machines resource settings. The VM resource settings can include reservations, limits, and shares. A reservation can include a claim or guarantee on a specific amount of a resource should the virtual machine demand it. A virtual machine's entitlement for a resource is higher than its reservation and lower than its limit. Dynamic entitlement can be equal to virtual machine demand if there are sufficient resources in the cluster to meet all virtual machine demands Otherwise, entitlement can be scaled down based on cluster capacity, the demands of other virtual machines, and settings for reservations, shares, and limits. Host load, or normalized entitlement, can be calculated by summing up entitlements of virtual machines running in a host, and normalizing it using the host's capacity. This normalized entitlement can be used to calculate a cluster balance metric, which can include a standard deviation of the normalized entitlements of hosts. Optimization can include minimizing the standard deviation value close to zero when making assignment decisions or load-balancing considerations. Support for reservations on a virtual machine's outbound bandwidth, such as transmit bandwidth, can allow the scheduler 108 to perform an admission control check to ensure that the sum of network reservations on a host do not exceed its capacity.

Figure 2A:
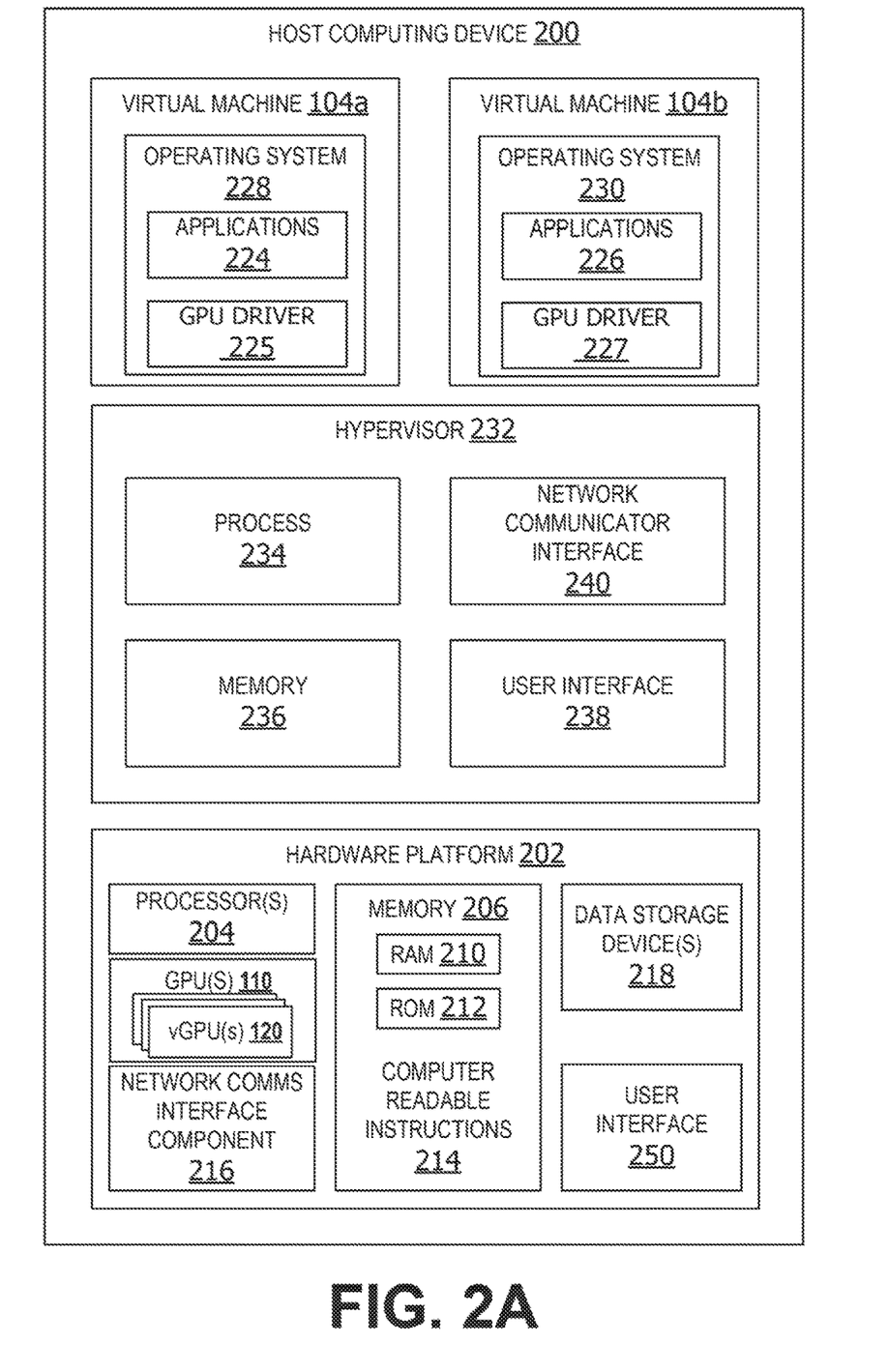
FIG. 2A is a block diagram illustrating an example of a host computing device of the data center.

FIG. 2A is a block diagram of a host computing device 200 for serving one or more virtual machines 104. The illustrated host computing device 200 can be implemented as any type of host computing device, such as a server 112. The host computing device 200 can be implemented as a VMWARE® ESXi host. The host computing device 200 can include a host for running one or more virtual machines 104.

The host computing device 200 can represent any device executing instructions, for example, application(s), operating system(s), operating system functionalities, and other functionalities associated with the host computing device 200. The host computing device 200 can include desktop personal computers, kiosks, tabletop devices, industrial control devices, and servers. The host computing device 200 can be implemented as a blade server within a RSA. Additionally, the host computing device 200 can represent a group of processing units or other computing devices.

The host computing device 200 can include a hardware platform 202. The hardware platform 202 can include one or more processor(s) 204, a memory 206, and at least one user interface, such as user interface component 250.

The processor(s) 204 can include any quantity of processing units and can execute computer-executable instructions for implementing the described functionalities. The instructions can be performed by the processor or by multiple processors within the host computing device 200 and can be performed by a processor external to the host computing device 200.

The host computing device 200 can include one or more computer readable media, such as the memory 206. The memory 206 can include media associated with or accessible by the host computing device 200. The memory 206 can include portions that are internal to the host computing device 200, external to the host computing device, or both. In some examples, the memory 206 can include a random access memory (RAM) 210 and read only memory (ROM) 212. The RAM 210 can be any type of random access memory. The RAM 210 can be part of a shared memory architecture. In some examples, the RAM 210 can include one or more cache(s). The memory 206 can include stores one or more computer-executable instructions 214.

The host computing device 200 can include a user interface component. In some examples, the user interface can include a graphics card for displaying data to the user and receiving data from the user. The hardware platform 202 or graphics card can include a GPU 110. The user interface can also include computer-executable instructions—for example, a driver, for operating the graphics card. Further, the user interface can include computer-executable instructions such as a driver for operating the display. User interface can be shown on a display such as a touch screen displays or natural user interface. The host computing device 200 can also provide the user interface through hardware including speakers, a sound card, a camera, a microphone, a vibration motor, one or more accelerometers, a BLUETOOTH communication module, global positioning system (GPS) hardware, and a photoreceptive light sensor.

The hardware platform 202 can also include a network communications interface component 216. The network communications interface component 216 includes a network interface card and/or computer-executable instructions such as a driver for operating the network interface card. Communication between the host computing device 200 and other devices can occur using any protocol or mechanism over any wired or wireless connection. In some examples, the communications interface is operable with short range communication technologies such as by using near-field communication (NFC) tags.

The data storage device(s) 218 can be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 218 can include rotational storage, such as a disk. The data storage device(s) 218 can also include non-rotational storage media, such as SSD or flash memory. In some non-limiting examples, the data storage device(s) 218 provide a shared data store. A shared data store is a data storage accessible by two or more hosts in a host cluster.

The host computing device 200 can host one or more virtual computing instances, including, but not limited to, virtual machines 104a and 104b. The virtual machine 104a can include instructions including one or more application(s) 224, a GPU driver 225, and an operating system 228. The operating system 228 can be a guest operating system of the virtual machine 104a. The virtual machine 104b can include instructions including one or more application(s) 226, a GPU driver 227, and an operating system 230. The operating system 230 can be a guest operating system of the virtual machine 104b. The instructions, when executed by the processor(s) 204, can operate to perform functionality on the host computing device 200.

Application(s) can include mail application programs, web browsers, calendar application programs, address book application programs, messaging programs, media applications, location-based services, search programs, and the like. The application(s) can communicate with counterpart applications or services such as web services accessible through a network. For example, the applications can represent downloaded client-side applications that correspond to server-side services executing in a cloud.

In some examples, modern enterprise applications in data center environments can be distributed in nature and can be I/O intensive. Each component of such distributed applications is packed into individual virtual machines and deployed in clusters of physical machines, such as, but not limited to, VMware vSphere clusters. In these examples, each component can have different resource demands. Each of the virtual machines running a component of a distributed application can also have highly diverse resource requirements. The scheduler 108 can perform an infrastructure optimization such that the application(s) running inside one or more virtual machines 104 is allotted the necessary resources to run.

Each virtual machine can include a guest operating system (OS). For example, virtual machine 104a can include a guest operating system (OS) 228, and virtual machine 104b can include guest operating system 230. Each virtual machine can also include a GPU Driver. In this example, virtual machine 104a can include GPU driver 225, and virtual machine 104b can include GPU driver 227. The host computing device 200 further includes one or more computer executable components. Components can include a hypervisor 232. The hypervisor 232 is a virtual machine monitor that creates and runs one or more virtual machines, such as, but without limitation, virtual machine 104a or virtual machine 104b. The hypervisor 232 can be implemented as a vSphere Hypervisor from VMware, Inc.

The host computing device 200 running the hypervisor 232 can be a host machine, and the virtual machine 104a can be a guest machine. The hypervisor 232 can present the operating system 228 of the virtual machine 104a with a virtual hardware platform. The virtual hardware platform can include virtualized processor 234, memory 236, user interface device 238 and network communication interface 240. The virtual hardware platform, virtual machine(s) and hypervisor are illustrated and described in more detail below.

Figure 2B:
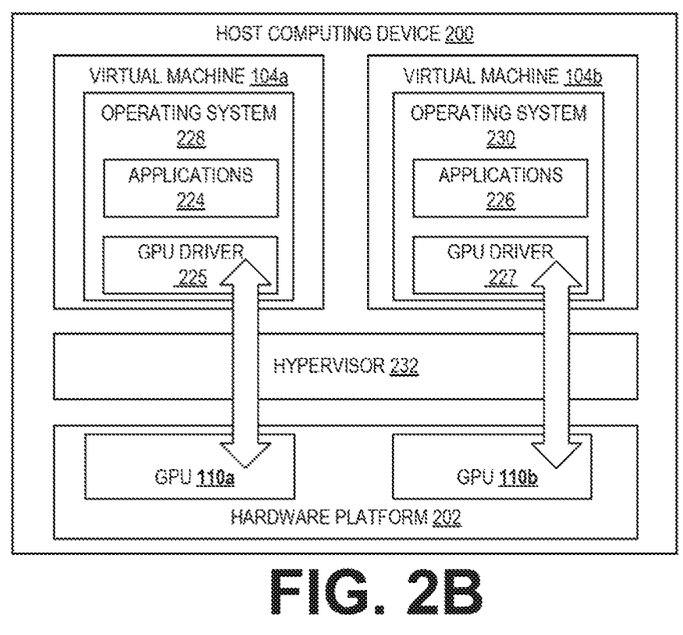
FIG. 2B is a drawing that illustrates an example of passthrough operation for graphics processing units (GPUs) in the host computing device.

FIG. 2B is a drawing that illustrates an example of passthrough operation for GPUs 110 of the host computing device. In passthrough operation, the scheduler 108 can assign the virtual machine 104a to the GPU 110a and the virtual machine 104b to GPU 110b. In this mode of operation, the scheduler 108 can give a virtual machine direct access to the physical GPU 110, and the virtual machine 104 can use the GPU as a native device. The operating system 228 can use the GPU driver 225 to control a GPU device 110a, and the operating system 230 can use GPU driver 227 to control a GPU device 110b. Accordingly, passthrough operation can allow exclusive assignment of a particular virtual machine to a particular GPU. Alternatively, software GPU sharing can be utilized in passthrough mode. In some cases, software GPU sharing is considered separate from passthrough operation.

To enable software GPU sharing, the hypervisor 232 can provide an abstraction layer that permits virtual machines to behave as though they have a dedicated GPU. For example, the GPU receives a single stream of requests, as though it serves only one host. The hypervisor 232 can include a driver that coordinates access to a GPU by the virtual machines on that server. The abstraction layer can be responsible for defining a uniform API that the virtual machines use and translating that API to a form supported by the GPU or an API of the GPU. The abstraction layer can also coordinate access to the GPU among all the virtual machines on that server that are GPU enabled.

Figure 2C:
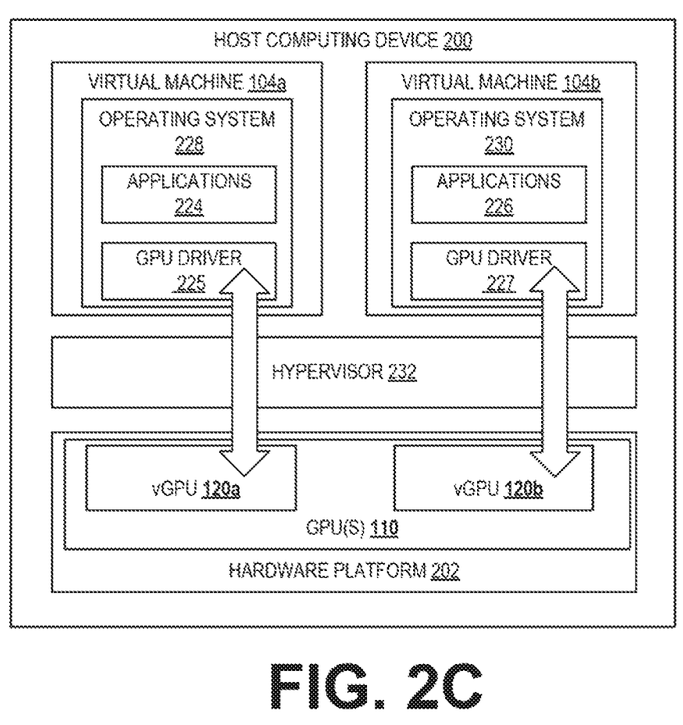
FIG. 2C is a drawing that illustrates an example of mediated passthrough operation for virtual GPU (vGPU) enabled GPUs in the host computing device.

FIG. 2C is a drawing that illustrates an example of mediated passthrough operation for virtual GPU enabled GPUs 110 in the host computing device. One example of a mediated passthrough solution is NVIDIA® GRID vGPU. In mediated passthrough operation, the scheduler 108 can assign the virtual machine 104a to the vGPU 120a and the virtual machine 104b to vGPU 120b. The operating system 228 can use GPU driver 225 to control a vGPU device 120a, and the operating system 230 can use GPU driver 227 to control a vGPU device 120b. Accordingly, mediated passthrough operation can allow exclusive assignment of a particular virtual machine 104 to a particular vGPU 120. In some cases, a vGPU 120 can operate similarly to a GPU 110 from the perspective of the virtual machine 104.

A vGPU manager component can be installed and executed in the hypervisor layer and can virtualize the underlying physical GPUs 110. For example GPUs 110, including NVIDIA® Pascal and others, can offer virtualization for both graphics and GPGPU (CUDA) applications.

A type of vGPU profile can be determined based on the amount of graphics memory each virtual machine can have. Table 1 includes available vGPU profiles for a GPU 110, the graphics memory for each virtual machine assigned to a run queue with the corresponding vGPU profile, and maximum number of virtual machines per physical GPU for each profile type. The vGPU specific profile types can be applicable to NVIDIA® Pascal P40 and other GPUs 110 with 24 gigabytes of graphics or GPU memory. A type can correspond to an amount of graphics memory per virtual machine.

TABLE 1

Example vGPU Profiles

| vGPU type | Graphics Memory per VM (in GB) | Maximum vGPUs per physical GPU |
| --- | --- | --- |
| P40-1q | 1 | 24 |
| P40-2q | 2 | 12 |
| P40-3q | 3 | 8 |
| P40-4q | 4 | 6 |
| P40-6q | 6 | 4 |
| P40-8q | 8 | 3 |
| P40-12q | 12 | 2 |
| P40-24q | 24 | 1 |

The memory in the physical GPU 110 can be divided, for example, into equal chunks and assigned to each virtual machine. Where equal division is used, each run queue and vGPU 120 of the GPU 110 can include the same vGPU profile, as the vGPU profiles can be correlated to allocated memory for the vGPU 120. However, unequal division can also be used, such that a vGPU 120 and run queue can be created on the GPU 110 as long as the GPU 110 includes sufficient unallocated memory to support a memory requirement of the vGPU profile of the vGPU 120.

For example, if a GPU 110 includes 24 gigabytes of memory and one existing vGPU 120 has been allocated 12 gigabytes, the GPU 110 can have 12 gigabytes of unallocated memory. A new vGPU 120 and run queue can be created with a vGPU profile of 1, 2, 3, 4, 6, 8 or 12 gigabytes, but a vGPU profile of 24 gigabytes would not be supported. In other words, the scheduler 108 can determine that a new vGPU profile for a new run queue or vGPU 120 can be created if a memory requirement of the new vGPU profile is less than or equal to the unallocated memory of the GPU 110.

Selection of a vGPU profile can define a number of virtual machines that can concurrently share the GPU and the performance that can be achieved by GPU based applications running inside those virtual machines. The performance of a vGPU can also depend upon the application/workload that is being executed. For a given task, using a higher-numbered profile or vGPU type can give improved performance in comparison to using a lower-numbered profile or vGPU type. A higher-numbered profile, for example, P40-24Q, can indicate a lower number of concurrent workloads and more device memory, which can reduce the GPU-CPU communication. Using a higher profile such as P40-24Q, as opposed to a lower numbered profile such as P40-6Q, can result in lower execution time for a job/task while increasing the waiting time for other jobs and reducing the utilization of the GPU. As a result, in some cases, in a cluster 116 of servers 112 with one or more GPUs 110 per server that service a number of tasks, the assignment of tasks to GPUs 110 can determine the utilization of the GPUs 110, the time to complete the jobs and the time spent by a job waiting for a GPU 110 to become available.

Figure 3:
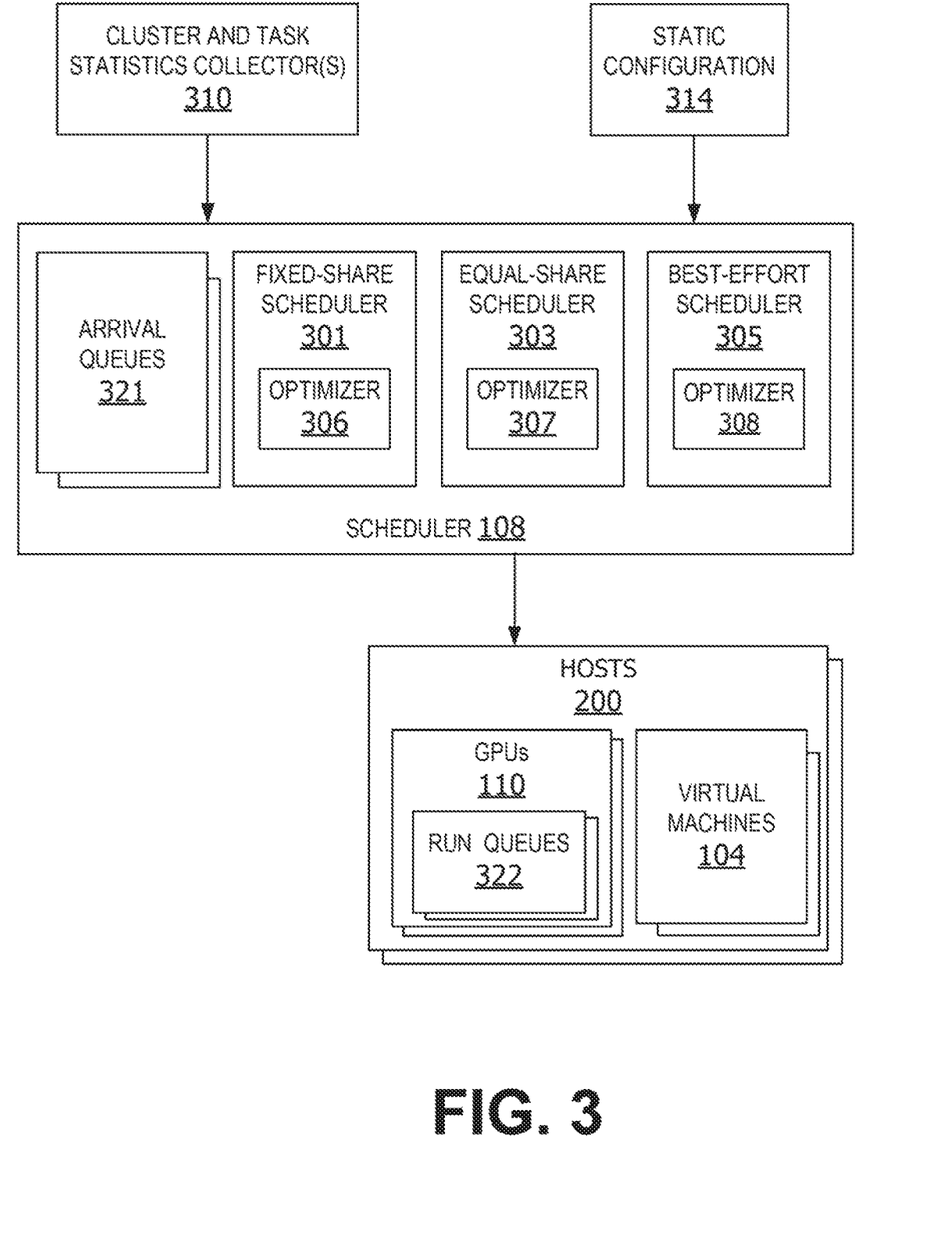
FIG. 3 is a block diagram illustrating an example of a scheduler in the data center.

FIG. 3 is an exemplary block diagram illustrating a scheduler 108. The scheduler 108 can place virtual machines on hosts with GPUs and assign virtual machines to a particular vGPU enabled GPU. The scheduler 108 can be executed by the hardware platform 202, for example, in a privileged mode or kernel modein the hypervisor 232. The scheduler 108 can also be executed in a user mode or superuser mode—for example, in a guest operating system such as the operating system 228 or operating system 230. In some cases, the scheduler 108 can include a component executed by the hypervisor 232 and another component in a guest operating system.

The scheduler 108 can include a fixed-share scheduler 301, an equal-share scheduler 303, a best-effort scheduler 305, and other schedulers based on various timing policies. The fixed-share scheduler 301 can include an optimizer 306 that finds a suitable host for an incoming or distressed virtual computing instance to optimize based on fixed-share timing as discussed further below. The equal-share scheduler 303 can include an optimizer 307 that finds a suitable host for an incoming or distressed virtual computing instance to optimize based on equal-share timing as discussed further below. The best-effort scheduler 305 can include an optimizer 308 that finds a suitable host for an incoming or distressed virtual computing instance to optimize based on best-effort timing as discussed further below. In some cases, other schedulers are utilized, or a combination of schedulers is utilized.

The collector 310 can collect task data associated the currently assigned tasks or virtual machines 104. The collector 310 can provide this task data to the scheduler 108. The statistics received from the collector 310 can include a number of GPUs, a number of tasks, host resource capacity, virtual machine resource demand and virtual machine resource usage. The host resource capacity data can include number of GPUs, total CPU and GPU utilization, total consumed memory and total network receive and transmit usage. The collector 310 can provide per-VM usage statistics, such as the virtual machine resource demand and virtual machine resource usage, to the scheduler 108.

Network traffic between hosts and virtual machines in a cluster can be unstable. The network traffic frequently includes periods of high usage followed by low usage. Due to the peaks and valleys in network traffic, averaging network traffic usage for a virtual machine 104 or host 200 is not always useful. Therefore, the virtual machine network resource usage statistics can be provided using a percentile measure. In these examples, a percent high-water mark can be used for stability in determining network usage. In one non-limiting example, the percent high-water mark can be the seventy-fifth percentile. In other examples, a high-water mark of the eightieth percentile can be utilized.

Moreover, in some examples, the cluster statistics can include internal send and receive traffic occurring on a single host, as well as external send and receive traffic occurring across different hosts. The external network traffic can be more expensive than the internal network traffic. These internal versus external communications traffic statistics are considered to avoid separating virtual machines 104 which communicate at a high rate with one another on the same host 200.

The scheduler 108 can retrieve the statistics from the collector 310 to evaluate the cluster status as the virtual machines 104 are generated or created and arrive in an arrival que 321 for assignment to a GPU 110. The scheduler 108 can receive basic topology information, graphics configuration data, rack boundary data, and link bandwidth data from the static configuration component 314. The graphics configuration data can include a number of GPUs 110, a number of vGPU enabled GPUs, a GPU memory for each GPU 110, a list of available vGPU profiles for each GPU 110 and a list of current run queues 322 with corresponding vGPU profiles. Each run queue 322 can be assigned a particular vGPU profile, and all tasks or virtual machines assigned to the run queue 322 can be performed according to the profile. Assignment of a virtual machine 104 to a particular GPU 110 can include assignment of the virtual machine 104 to a particular run queue 322 of the GPU based on a vGPU profile of the run queue 322. A task or virtual machine 104 can be generated and assigned a particular vGPU profile, for example, based on the memory requirements or other requirements of the task.

The scheduler 108 can assign a particular a task or virtual machine 104 to a particular GPU 110 and run queue 322. A run queue 322 can be a queue to be handled by a vGPU 120 of the GPU 110. In some cases, scheduler 108 can also place the virtual machine 104 on a particular host 318 that includes or has access to the GPU 110. The hosts 200 can include virtual machines 104 running on one or more of the hosts 200. The hosts 200 can be implemented as physical host computing devices. A host 200 can also include a hypervisor running one or more virtual machines.

Figure 4:
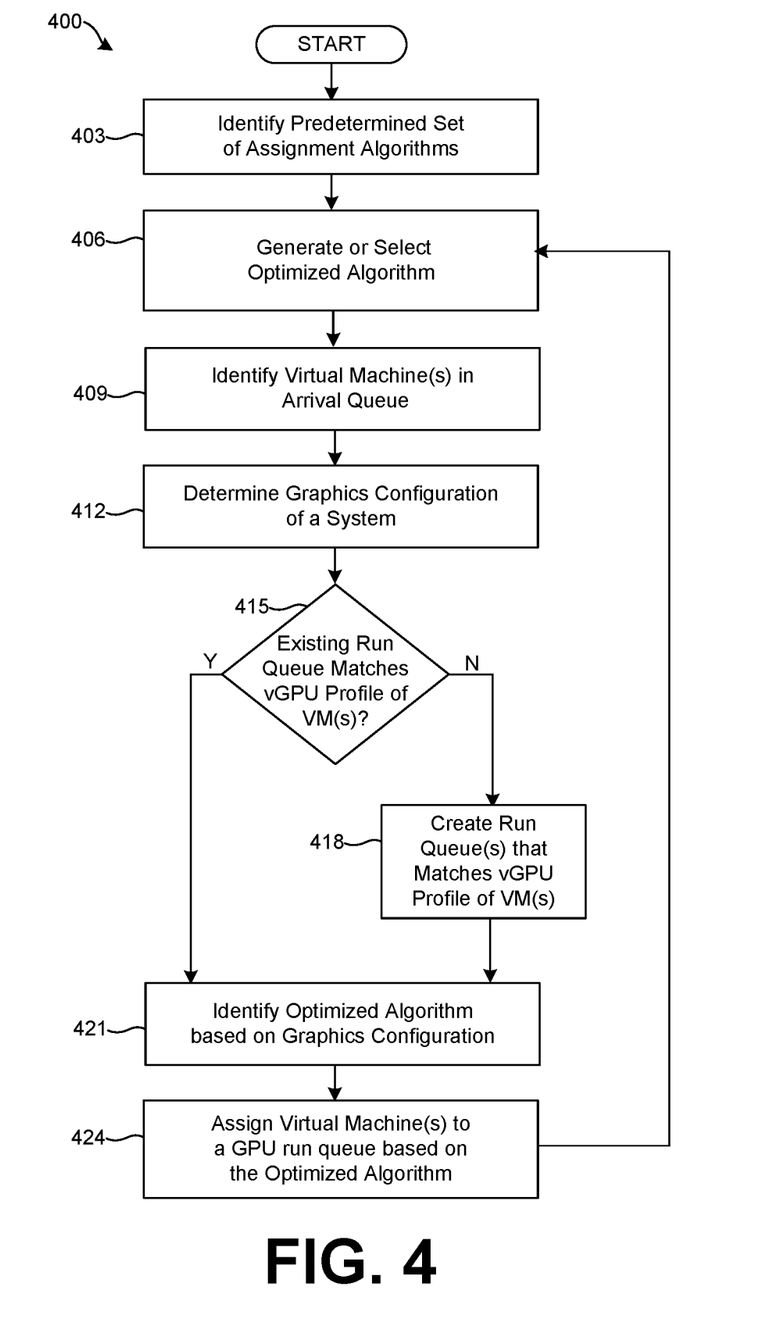
FIG. 4 is a flowchart that illustrates an example of functionalities performed by the scheduler.

FIG. 4 shows an example flowchart 400, describing steps that can be performed by instructions executed by the data center 101. Generally, the flowchart 400 describes how the scheduler 108 can determine whether to assign a particular task/job/virtual machine to a particular GPU, given the constraints imposed by the particular virtual GPU solution, such as vGPU. The scheduler 108 can determine an optimal virtual machine assignment algorithm for a particular system and utilize the algorithm to assign the virtual machine to a GPU run queue.

In step 403, the scheduler 108 can identify a predetermined set of one or more assignment algorithms. For example, the scheduler 108 can provide a user interface element through which an assignment algorithm can be entered, uploaded, or otherwise provided to the scheduler 108. The assignment algorithms can define rules or policies that can be used to determine whether a particular task or virtual machine should be assigned to a particular GPU, based on a graphics configuration of a system. The graphics configuration can include a number of GPUs, a number of vGPU enabled GPUs, a GPU memory for each GPU, a list of available vGPU profiles for each GPU and a list of existing run queues 322 and corresponding vGPU profiles.

Predetermined task assignment rules or algorithms can include first come first serve (FCFS), longest first, longest wait first, random, and shortest first. FCFS: On each simulator clock tick, the FCFS algorithm assigns first virtual machine on the arrival queue 321, then the second, and so on. Longest first: On each simulator clock tick the longest first assignment algorithm tries to assign the virtual machine with the longest expected run time first, then the one with the second longest run time, and so on. Expected run time can be defined by a user that creates the task, or can be determined based on an average measured time for similar tasks such as those with a related process list, task type, number of lines of code, or other similarity factors. Longest wait first: On each simulator clock tick, this algorithm tries to assign the virtual machine with the longest wait time first, then the one with the second longest wait time, and so on.

Wait time can refer to wait time in an arrival queue 321, run queue 322, or both. Run queue wait time can be utilized where a currently assigned virtual machine is reevaluated, for example, to update its placement to a particular position in a run queue 322. Random: On each simulator clock tick, this algorithm randomly selects a virtual machine and tries to assign it, then selects another one at random and so on. Random selection can refer to selection based on a random or pseudorandom selection function. Shortest first: On each simulator clock tick, this algorithm tries to assign the virtual machine with the shortest expected run time first, then the one with the second shortest run time, and so on.

In step 406, the scheduler 108 can generate an optimized algorithm based on machine learning. The scheduler 108 can correlate these optimized algorithms with aspects or parameters of the graphics configuration including a number of GPUs 110, an average or median arrival rate for virtual machines 104 queued in the arrival queue 321, a number of GPUs 110 with a particular vGPU profile, an average or median number of virtual machines 104 assigned to each run queue 322 and other parameters.

A machine learning calculation can utilize simulated and actual inputs, as well as simulated and actual outputs, in order determine the optimal assignment algorithm to maximize for a predetermined cost function. In some cases, the machine learning calculation can select one of the predetermined assignment algorithms as an optimal algorithm. The scheduler 108 can select an optimal algorithm using simulation and analysis of actual results. In other cases, the machine learning calculation can generate a new algorithm or set of rules. The new algorithm can include a modified version of one or more of the predetermined assignment algorithms. The scheduler 108 can modify the predetermined assignment algorithms using actual results, simulations, and machine learning techniques as discussed below.

The scheduler 108 can include a simulator that allows comparison of different techniques and algorithms. A cost function can be defined and can be used to compare the different solutions. The simulator can be built to utilize as many assignment algorithms as needed. The simulator can be viewed as including logical components; a first component can generate a load, task or virtual machine that can be assigned on a vGPU enabled system or cloud. A second component can model the vGPU enabled system as a set of run queues 322 and the assignment of tasks in the vGPU enabled system using any one of the many assignment algorithms under consideration. The simulator can also consider real-world or actual tasks collected by the cluster and task statistics collector 310.

The load-generator can generate tasks using a user-provided or simulator-generated rate parameter, lambda. In the simulator, the inter-arrival time between tasks can be distributed exponentially, linearly or uniformly. In some examples, each time a job is created, the simulator can assign it in a particular category of a list of for task categories. Examples of task categories or types can include:
 Tasks that do inference using a machine learning (ML) model that has been trained (these can be called ML-inference tasks),
 Tasks that train a ML model (these can be called ML-training tasks) and
 Tasks that run a CAD software (these can be called CAD-tasks).

Additional categories can also be considered. Each category can include different characteristics. The ML-inference tasks can have a run-time less than one second and need either P40-12Q or P40-24Q profile. The ML-training tasks can use a P40-12Q or a P40-24Q profile and can have a run time of forty-five minutes when using convolution neural networks (CNN) on MNIST benchmark. A run-time of six hours can result when using the recurrent neural network (RNN) on PTB benchmark. CAD-tasks are interactive tasks. In some examples, CAD-tasks can be created in a time window between 8 AM and 10 AM each day and can complete in a time window between 4 PM and 6 PM. These time windows can be chosen or determined by the simulator based upon real-world usage of vGPU enabled systems. The vGPU profile request for CAD-tasks can be uniformly distributed over all available P40 profiles. This can be based on the performance of ML and CAD benchmarks. The vGPU profile associated with a task can be an example constraint on when and where it can be assigned.

ML-training tasks can be considered batch tasks and can be suspended and resumed as needed to make space for other tasks. The example set of results present a rule that can be utilized to decide when to suspend and resume ML-training tasks. For example, ML-training tasks can run only at night, between 6 PM and 8 AM based on industry practices. Other task categories can utilize other rules as defined in a usage rule, policy, or algorithm that includes suspend, resume, run durations, time windows for execution, and other rules various ways.

Once tasks are created by a user or the simulation, they can be assigned into one of the categories described above, for example, using a uniform random variable. With a probability of 50%, a task created between 8 am-10 am can be an ML-inference task, otherwise it can be a CAD-task. Outside this time window, a task can be an ML-inference task with 98% probability and with 2% probability it can be a ML-training task. In other examples, these probabilities can be varied and optimized based on desired or actual conditions, or otherwise as defined. Once a task has been created, it can be queued in an arrival queue 321. A system or simulation can include a single arrival queue 321 or a particular number of arrival queues 321. For each simulation clock tick, a task or tasks can be selected from the arrival queue(s) 321 using an assignment algorithm and assigned to one of several run queues 322. Each run queue 322 can include a list of tasks currently being executed by a GPU 110.

Where multiple vGPU profiles are supported, each can support different maximum number of virtual machines. A run queue size can refer to a maximum number of tasks that can be accommodated for a particular vGPU profile. A task can be referred to as a virtual machine since each task can run in its own virtual machine. In some examples, the vGPU profile of a run queue 322 can be defined by the vGPU profile of the first task that is scheduled on that queue. Tasks that arrive second, third or later at a run queue 322 can join the queue based on a number of conditions being satisfied, for example:
 The vGPU profile of the incoming task matching the vGPU profile of the run queue 322.
 The current number of tasks assigned to the run queue 322 being less than the maximum allowed number of tasks or virtual machines for the run queue's vGPU profile.

Once a run queue 322 empties out, for example because the GPU has completed all the tasks assigned to it, its profile can be forgotten, erased or removed. In some cases, the run queue 322 is not associated with any profile until a task is assigned to it, at which time it can assume the profile of that task. Another way to erase the profile of a run queue 322 can be to suspend all the tasks on that queue thereby emptying it out and clearing its profile. This mechanism of erasing the profile of a run queue 322 can create another dimension to be handled by assignment algorithms.

Suspending and subsequently resuming tasks as an assignment technique can be used in multiple different ways. In one example, one or more tasks can be suspended to free up capacity in a run queue 322 for an incoming task with the same vGPU profile. In a second example, all the tasks on a run queue 322 can be suspended in order to allow assignment of a new task, regardless of its vGPU profile. These two dynamic suspend-resume techniques can allow assignment algorithms significant flexibility.

Once a task has been assigned to a run queue 322, the GPU 110 can control its execution using a number of timing policies, which can include fixed-share timing, equal-share timing, or best-effort timing. A timing policy can be selected based on a user selection or can be selected by the scheduler 108 to maximize for the cost function. Some example timing policies are described below.

In a fixed-share timing policy, the GPU can divide time into as many time-slices as the maximum number of tasks or virtual machines supported by the GPU at the current vGPU profile. For example, if the GPU is running with a P40-4Q profile, it can divide into six time-slices. If there are only two tasks running on the GPU, each can get one time-slice and the remaining four time-slices can be wasted. This timing policy can result in time-slices being wasted if the run queue 322 is not full but can result in the execution time for a task regardless of how full the queue is. In other words, the quantum of time for task execution can be equivalent regardless of whether the run queue 322 is 10% full, or 50% full, or 100% full.

In an equal-share timing policy, the GPU can divide time into as many time-slices as there are tasks in the run queue 322. Compared to fixed-time timing, this policy can waste fewer time-slices but can still assign time-slices to a task even if the task does not have any computations to execute on the GPU. If a task is waiting on an I/O or doing CPU computation, it can nevertheless hold on to its time-slice. This policy can potentially waste time-slices but can result in a fair division of GPU time to each task on the run queue 322.

In a best-effort timing policy, the GPU can assign time-slices to those tasks that have GPU computation to execute. For example, if a task on the run queue 322 does not have any GPU computation, it does not receive its time-slice. This timing policy can result in a high GPU utilization but can be unfair in how much time a task receives.

The simulator can implement each of the timing policies. In some cases, the timing policy that is used can be selected by a user. The simulator can also determine if the performance of a particular assignment algorithm is impacted based on the choice of timing policy, and can select a timing policy to maximize a cost function A cost function can be used to compare different virtual machine assignment algorithms as a product of metrics that can include utilization of the GPUs, a number of tasks completed, time spent by a task waiting for a GPU to become available, and other factors. In some examples, a system can include "r" GPUs, and the simulation can run for "C" clock cycles, as well as a run queue 322, wherein "$R^i$" can execute a task for "$R^i_c$" clock cycles. A utilization, "U," of the GPUs can be described as:

$$U = \frac{1}{r}\left(\sum_{i=1}^{r} \frac{R^i_c}{C}\right), \text{ and } 0 \leq U \leq 1 \quad (1)$$

The number of tasks completed can be computed by calculating, at the end of the simulation or for a predefined period of time, the number of tasks completed to the total number of tasks in the system. The total number of tasks in the system can be defined as the sum of the tasks waiting to get onto a run queue 322, the tasks in the run queues 322, and the tasks that have completed execution. This ration can be defined as "N."

In some cases, to obtain an optimal solution, the simulator can maximize the metrics "U" and "N," and minimize time spent waiting. The simulator can redefine the third metric as the ratio of time spent executing to the total time spent in the system so that if a task or job "J" spends "$J_r^i$" cycles executing on a run queue 322, and "$J_w^i$" cycles waiting to get onto a run queue 322, and there are "m" tasks in total in the system, then the ratio, E, can be defined as:

$$E = \frac{1}{m}\left(\sum_{i=1}^{m} \frac{J_r^i}{(J_r^i + J_w^i)}\right), \text{ and } 0 \leq E \leq 1 \quad (2)$$

The ratio E can be a ratio of an average execution for a plurality of virtual machines and an average total time in the system for the plurality of virtual machines. Total time can include execution time and wait time. "$J_r^i$" can depend on a number of cycles during which the task is actually executing, rather than just the number of cycles for which the task is on the run queue 322. This distinction can be relevant because when a GPU is multiplexed among many tasks, only one task executes at a time, and the task does not execute when the current time slice does not belong to it. Further, different GPU timing policies can handle time slices differently as described. A fixed-share timing policy can have a different value for this ratio than a best-effort timing policy as a result of time-slices left idle with fixed-share timing as compared to best-effort timing. A second point to note is that when a task is suspended and subsequently resumed, the clock cycles spent during the suspend and resume operations can be included in the term, "$J_r^i$." The time between completion of suspend and the start of resume can be spent in the waiting queue and can be included in the term, "$J_w^i$."

Cost functions can be defined in multiple ways, as the specific needs of a system or priorities of administrators can vary. In some cases, the cost function can be defined as:

$$\text{Cost} = U \times N \times E, 0 \leq \text{Cost} \leq 1 \quad (3)$$

In other examples, cost function can be defined as a geometric mean of two parameters:

$$\text{Cost} = \sqrt[2]{U \times E}, 0 \leq \text{Cost} \leq 1 \quad (4)$$

Other cost functions can also be used.

The VM-assignment simulator can rank the assignment algorithms using cost as a criterion. The simulator can also use machine learning to develop new assignment algorithms that can maximize for the cost function. An algorithm that maximizes the cost can be considered optimal.

Machine learning techniques can include simulated annealing. On each simulation clock-cycle, the simulation can generate a state S0 that includes assignments of tasks to GPU 110 run queues 322 based on a predetermined algorithm, such as a random algorithm. The simulation can perform simulation for state S0, and compute the cost function. The simulation can set the simulated annealing temperature parameter T=1.0. The simulated annealing technique can be repeated while T>0.0001. For each value of T, the simulation can pick a task at random from state S0. Replace it with a random task NOT in S0. The simulation can compute a cost function for the changed S0. If the new cost is lower, the simulation can keep the changed S0. If the new cost is higher BUT the acceptance probability>a random number from a uniform distribution, the simulation can keep the changed S0. Otherwise, the simulation can discard the change in S0 and put back the task that was previously removed. The simulation can repeat for an updated temperature that can be calculated, for example, as a previous temperature*0.9.

Machine learning techniques can include bin packing heuristic. For this technique, on each simulation clock cycle, for each Job (J) waiting to run, identify GPUs on which the job can run. For each GPU (G) on which the job can run, the simulation can calculate the cost-function C if Job J was assigned to GPU G. The simulation can record or store the tuple <J, G, C>. Choose the tuple <J, G, C> with the highest value of C. The simulation can sort the tuples <J, G, C> using C as the key in reverse order. The simulation can select as many Jobs as possible from the sorted list of tuples.

Other machine learning techniques can also be used, such as particle swarm, genetic algorithm and other machine learning techniques. The scheduler 108 can perform these techniques using real and simulated systems with a wide variety of graphics configurations. The scheduler 108 can generate a table or other data structure that correlates an optimized algorithm with a graphics configuration. In some cases, the data structure can specify optimized algorithms correlated to a single parameter, such as a number of GPUs. In other cases, the data structure can specify the optimized algorithm based on multiple parameters of the graphics configuration. The table or other data structure can be stored in the data storage device 103 or 118. An optimized assignment algorithm can be selected or generated based on the results that optimize for the cost function, and can be correlated to a graphics configuration. As can be understood, the machine learning techniques can be seeded or trained based on known assignment techniques but can result in modified versions of the known assignment techniques as results of the machine learning technique are analyzed. For example, in simulated annealing, while the initial assignment can be based on one of the known techniques, replacement of a random tasks in S0 can result in a new rule or modification to the initial seed or known technique. In any of the machine learning techniques, the scheduler 108 can compare the results of existing algorithms to machine learning analyses in order to determine modifications to the existing algorithms that optimize for the cost function.

The optimized algorithm can specify rules that can be utilized to determine whether to assign a task or to wait. The optimized algorithm can also specify rules that determine an optimal run queue 322. Because task position in a run queue 322 can be considered in these techniques, an optimal position in the run queue 322 can also be determined.

In step 409, the scheduler 108 can identify a virtual machine 104 in an arrival queue 321. For example, an administrator can generate a new task to perform in a virtual machine 104. Once the virtual machine 104 is defined, it can be queued in an arrival queue 321. The arrival queue 321 can include a list of virtual machines 104 that are not assigned to a GPU 110. The virtual machine 104 can be assigned a vGPU profile. In some cases, the scheduler 108 analyzes a process list of the virtual machine 104 and assigns the vGPU profile based on processes identified in the process list. For example, the scheduler 108 can associate a process with a particular memory requirement, determine a memory requirement of the virtual machine 104 based on the process list, and identify an appropriate vGPU profile that corresponds to the memory requirement. In other cases, the scheduler 108 can associate a particular vGPU profile with a characteristic of the virtual machine 104. Characteristics of the virtual machine 104 can include a type of the virtual machine 104 or task, a process list, a particular process, a size of the virtual machine 104 and a time the virtual machine 104 was created and queued.

In step 412, the scheduler 108 can determine or identify a graphics configuration of the system. For example, the scheduler 108 can receive statistics from the collector 310 and the static configuration component 314. The scheduler 108 can receive, from the collector 310 and the static configuration component 314, system configuration data that includes the graphics configuration, as well as basic topology information, rack boundary data and link bandwidth data. The graphics configuration can include a number of GPUs 110, a number of vGPU enabled GPUs, a GPU memory for each GPU 110, a list of available vGPU profiles for each GPU 110 and a list of current run queues 322 with corresponding vGPU profiles. Each run queue 322 can be assigned a particular vGPU profile, and all tasks or virtual machines assigned to the run queue 322 can be performed according to that vGPU profile.

In step 415, the scheduler 108 can determine whether an existing run queue 322 matches a vGPU profile of the virtual machine 104. If no run queue 322 in the system includes a vGPU profile that matches that of the virtual machine 104, the scheduler 108 can move to step 418. If one or more of the existing run queues 322 include a vGPU profile that matches the vGPU profile of the virtual machine 104, then the scheduler 108 can move to step 421.

In step 418, the scheduler 108 can create a new run queue 322 with a vGPU profile that matches the vGPU profile of the virtual machine 104. The new run queue 322 can be added to a GPU 110 that supports the particular vGPU profile of the virtual machine 104 and includes sufficient unallocated memory to create the new run queue 322. For example, the scheduler 108 can determine a memory size of the GPU 110 specified in the graphics configuration and a current list of its run queues 322, along with the vGPU profile of each run queue. The scheduler 108 can determine unallocated memory of the GPU 110 by subtracting memory allocated to each existing run queue 322 according to its vGPU profile. The scheduler 108 can determine that the GPU 110 includes sufficient unallocated memory if the unallocated memory is equal to or greater than a memory requirement of the new vGPU profile.

In other cases, memory can be allocated equally in a GPU 110, and each run queue 322 can include the same vGPU profile. Each vGPU profile can be associated with a maximum number of vGPUs 120 or run queues 322 supported concurrently, for example, based on equal division of memory of the GPU 110. The scheduler 108 can determine whether a number of run queues 322 of the GPU 110 is less than the maximum number of queues. The new run queue 322 can be added to a GPU 110 that is using the vGPU profile of the virtual machine 104, and the GPU 110 includes less than the maximum number of queues.

In step 421, the scheduler 108 can identify an optimized algorithm based on graphics configuration of the system. As discussed in step 406, the scheduler 108 can, based on machine learning of real and simulated assignment results, correlate optimized algorithms with aspects or parameters of graphics configuration. The scheduler 108 can analyze the graphics configuration of the system, including its number of GPUs 110, average or median arrival rate for virtual machines 104 queued in the arrival queue 321, number of GPUs 110 with a particular vGPU profile, average or median number of virtual machines 104 assigned to each run queue 322, and other parameters. The scheduler 108 can match the current graphics configuration to an optimized algorithm based on a table or other data structure stored in the data storage device 118 or 103 that correlates optimized algorithm with graphics configuration. In some cases, the scheduler 108 can identify an optimized algorithm based on a single parameter of the graphics configuration, such as a number of GPUs. In other cases, the scheduler 108 can identify the optimized algorithm based on multiple parameters of the graphics configuration.

In step 424, the scheduler 108 can assign a virtual machine 104 to a run queue 322 of a GPU 110 based on the optimized algorithm. The scheduler 108 can also place or implement the virtual machine 104 in a host 200 available to the selected run queue 322. In some cases, the scheduler 108 places the new virtual machine 104 at an end of the run queue 322 to which it is assigned. The scheduler 108 can also determine an optimal position in the run queue 322 and assign the virtual machine 104 to that position. The scheduler 108 can move or shift a position of one or more virtual machine 104 to accommodate the new virtual machine 104.

Multiple virtual machines 104, such as a batch or group of virtual machines 104 can be considered concurrently. The group of virtual machines 104 can include all virtual machines 104 in the arrival queue 321 or a predetermined number of virtual machines 104 from the arrival queue 321. Where multiple virtual machines 104 are analyzed concurrently, the scheduler 108 can determine an optimal order to assign the virtual machines 104 and perform the assignments of the virtual machines 104 in that order.

The scheduler 108 can perform the identification of the optimized algorithm to utilize and the assignment of the virtual machine 104 in real time, for example, within in milliseconds or tens of milliseconds. However, generating the optimized algorithms can be performed for a predetermined initial simulation time and continuously during real-world operations.

Figure 5A:
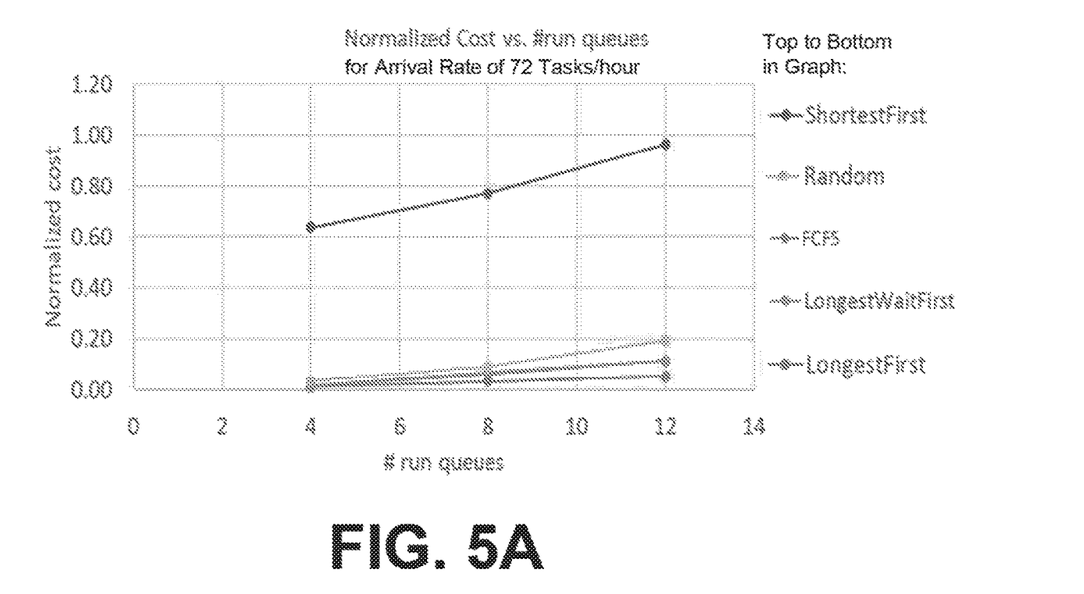
FIGS. 5A-5D are graphs that show example results for normalized cost as a function of run queues for different assignment policies.

FIG. 5A shows an example of normalized cost vs. a number of run queues 322 for an arrival rate of 72 tasks per hour, using the best-effort timing policy. For each choice of assignment policy, parameters can be varied, which can include varying the number of run queues 322 from four to eight to twelve. The cost function in this example can be the cost function of equation 3.

Figure 5B:
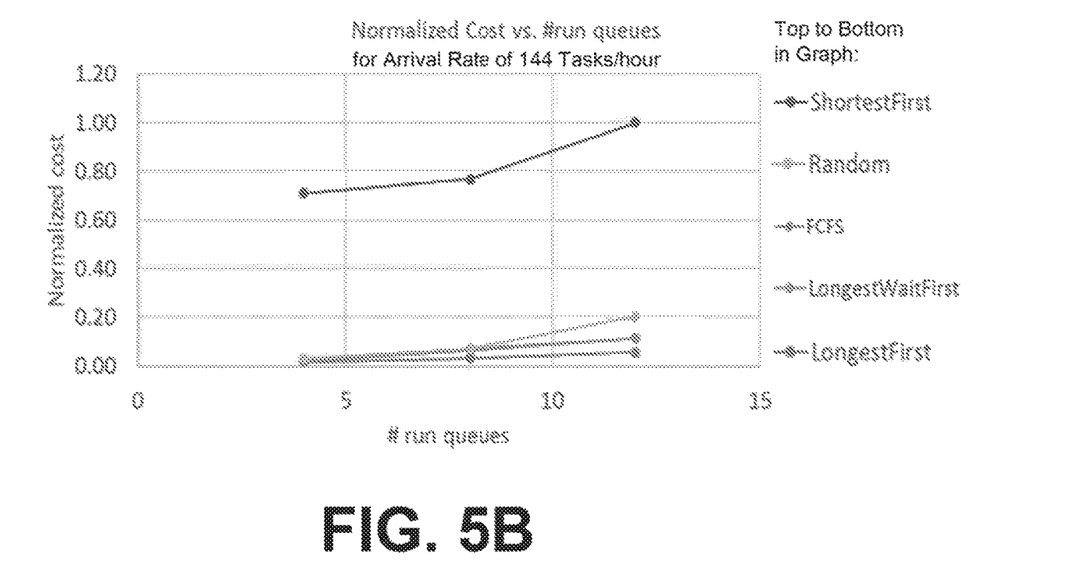

FIG. 5B shows an example of normalized cost vs. a number of run queues 322 for an arrival rate of 144 tasks per hour, using the best-effort timing policy. For each choice of assignment policy, parameters can be varied, which can include varying the number of run queues 322 from four to eight to twelve. The cost function in this example can be the cost function of equation 3.

Figure 5C:
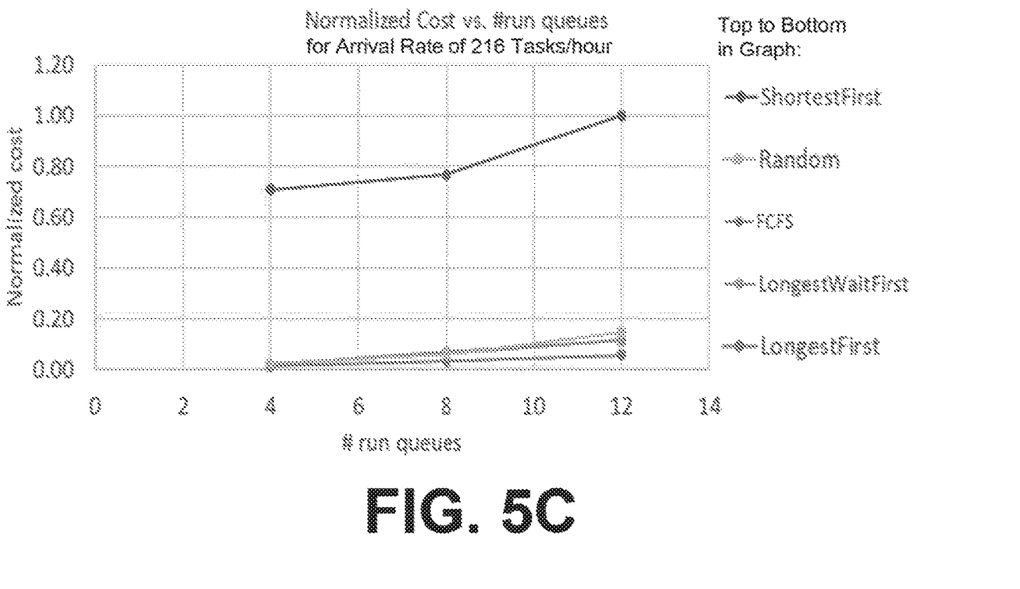

FIG. 5C shows an example of normalized cost vs. a number of run queues 322 for an arrival rate of 216 tasks per hour, using the best-effort timing policy. For each choice of assignment policy, parameters can be varied, which can include varying the number of run queues 322 from four to eight to twelve. The cost function in this example can be the cost function of equation 3.

Figure 5D:
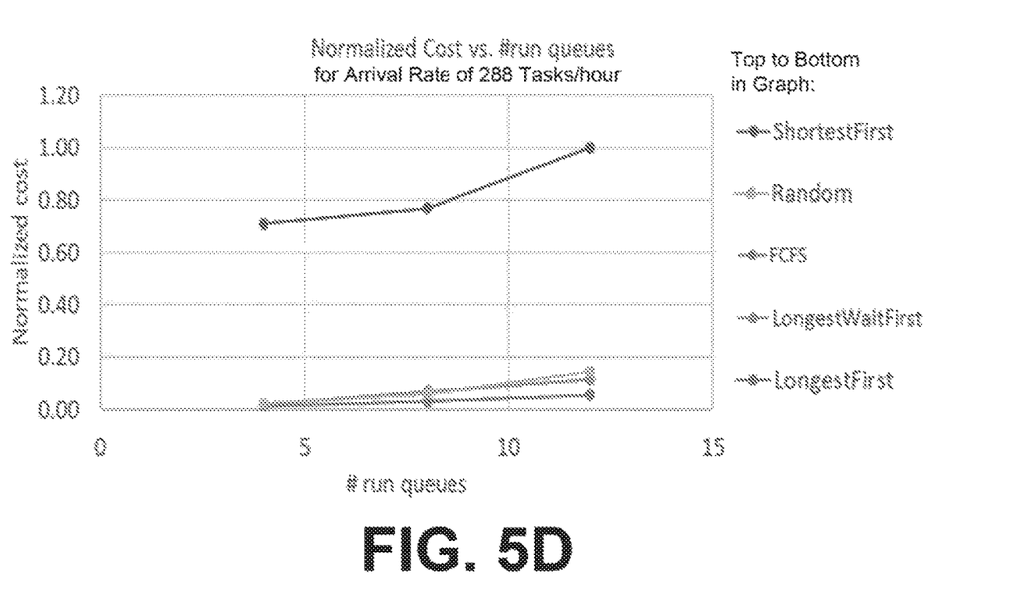

FIG. 5D shows an example of normalized cost vs. a number of run queues 322 for an arrival rate of 288 tasks per hour, using the best-effort timing policy. For each choice of assignment policy, parameters can be varied, which can include varying the number of run queues 322 from four to eight to twelve. The cost function in this example can be the cost function of equation 3.

In the examples of FIGS. 5A-5D, the "shortestFirst" policy can be most suitable to the system configuration. The performance measured using the normalized cost function value can show an improvement in the cost function values as the arrival rate increases from 72 to 144 per hour but subsequent increases in the arrival rate have minimal or no impact on the cost function values. In other situations, other policies can be chosen based on user selection, cost function definition, or other considerations. The simulator can also include assignment policies based on simulated annealing optimization, particle swarm optimization, and a bin packing optimization. Different cost functions can be designed and utilized for comparison or ranking of assignment policies. Different workloads can also be utilized and compared based on real world expectations for execution in a vGPU cloud, for example, based on actual or detected workloads in a functioning cloud.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A computer-implemented method, comprising:
    identifying, by a scheduler service executed by at least one processor, a predetermined set of assignment algorithms;
    modifying, by the scheduler service, at least one of the predetermined set of assignment algorithms to generate a plurality of trained assignment algorithms that are trained to maximize a cost function comprising: a ratio of an average execution time for a plurality of virtual machines, and an average total time corresponding to execution time and run queue wait time for the plurality of virtual machines;
    generating, by the scheduler service, a data structure that correlates, using the cost function, a particular one of the plurality of trained assignment algorithms with a plurality of graphics configuration parameters;
    identifying, by the scheduler service, a virtual machine that is assigned a virtual graphics processing unit (vGPU) profile from an arrival queue;
    identifying, by the scheduler service, a graphics configuration of a system comprising a plurality of host computers, the graphics configuration specifying a total number of vGPU-enabled graphics processing units (GPUs) installed in the plurality of host computers in the system and a virtual machine arrival rate for the arrival queue of the system;
    determining that an existing run queue of a vGPU-enabled GPU of the system matches the vGPU profile of the virtual machine;
    receiving, by the scheduler service, data specifying a plurality of pre-existing virtual machines in the existing run queue of the vGPU-enabled GPU of the system;
    selecting, by the scheduler service, the particular one of the trained assignment algorithms that is correlated, in the data structure, with the total number of vGPU-enabled GPUs and the virtual machine arrival rate specified by the graphics configuration of the system;
    suspending, by the scheduler service, a particular one of the plurality of pre-existing virtual machines in the run queue in order to free up capacity for the virtual machine, and inserting the virtual machine in a particular position in the run queue to arrange a set of virtual machines in the run queue into an updated order provided by the trained assignment algorithm that is trained to optimize the cost function; and
    executing the virtual machine and the pre-existing virtual machines according to the updated order of the run queue.

2. The computer-implemented method of claim 1, wherein the virtual machine is assigned to the run queue further based on expected virtual machine execution time of the virtual machine, and virtual machine arrival queue wait time of the virtual machine.

3. The computer-implemented method of claim 1, wherein the-vGPU profile is assigned to the virtual machine based on a process list of the virtual machine.

4. The computer-implemented method of claim 1, wherein the virtual machine is assigned to the run queue further based on expected virtual machine execution time of the virtual machine.

5. The computer-implemented method of claim 1, wherein a number of run queues of the vGPU-enabled GPU is less than a maximum number of queues.

6. The computer-implemented method of claim 1, wherein the virtual machine is associated with a task comprising a group of virtual machines.

7. The computer-implemented method of claim 6, further comprising:
    determining that the vGPU-enabled GPU supports the vGPU profile.

8. A non-transitory computer-readable medium comprising executable instructions, wherein the instructions, when executed by at least one processor, cause at least one computing device to at least:
    identify, by a scheduler service executed by at least one processor, a plurality of trained assignment algorithms that are trained to maximize a cost function comprising: a ratio of an average execution time for a plurality of virtual machines, and an average total time corresponding to execution time and run queue wait time for the plurality of virtual machines;
    generate, by the scheduler service, a data structure that correlates, using the cost function, a particular one of the plurality of trained assignment algorithms with at least one of graphics configuration parameter;

identify, by the scheduler service, a virtual machine that is assigned a virtual graphics processing unit (vGPU) profile from an arrival queue;

identify, by the scheduler service, a graphics configuration of a system comprising a plurality of host computers, the graphics configuration specifying a total number of vGPU-enabled graphics processing units (GPUs) installed in the plurality of host computers in the system and a virtual machine arrival rate for an arrival queue of the system;

determine that an existing run queue of a vGPU-enabled GPU of the system matches the vGPU profile of the virtual machine;

receive, by the scheduler service, data specifying a plurality of pre-existing virtual machines in the existing run queue of the vGPU-enabled GPU of the system;

select, by the scheduler service, a particular one of the trained assignment algorithms that is correlated, by the data structure, with at least one of: the total number of vGPU-enabled GPUs and the virtual machine arrival rate specified by the graphics configuration of the system;

suspend, by the scheduler service, a particular one of the plurality of pre-existing virtual machines in the run queue in order to free up capacity for the virtual machine, and insert the virtual machine in a particular position in the run queue to arrange a set of virtual machines in the run queue into an updated order provided by the trained assignment algorithm that is trained to optimize the cost function; and execute the virtual machine and the pre-existing virtual machines according to the updated order of the run queue.

9. The non-transitory computer-readable medium of claim 8, wherein the virtual machine is assigned to the run queue further based on expected virtual machine execution time of the virtual machine, and virtual machine arrival queue wait time of the virtual machine.

10. The non-transitory computer-readable medium of claim 8, wherein the vGPU profile is assigned to the virtual machine based on a process list of the virtual machine.

11. The non-transitory computer-readable medium of claim 8, wherein the virtual machine is assigned to the run queue further based on expected virtual machine execution time of the virtual machine.

12. The non-transitory computer-readable medium of claim 8, wherein a number of run queues of the vGPU-enabled GPU is less than a maximum number of queues.

13. The non-transitory computer-readable medium of claim 8, wherein the virtual machine is associated with a task comprising a group of virtual machines.

14. A system, comprising:
at least one computing device comprising at least one processor; and
a memory comprising executable instructions, wherein the instructions, when executed by the at least one processor, cause the at least one computing device to at least:
identify, by a scheduler service executed by at least one processor, a plurality of trained assignment algorithms that are trained to maximize a cost function comprising: a ratio of an average execution time for a plurality of virtual machines, and an average total time corresponding to execution time and run queue wait time for the plurality of virtual machines;

generate, by the scheduler service, a data structure that correlates, using the cost function, a particular one of the plurality of trained assignment algorithms with at least one of a plurality of graphics configuration parameters;

identify, by the scheduler service, a virtual machine that is assigned a virtual graphics processing unit (vGPU) profile from an arrival queue;

identify, by the scheduler service, a graphics configuration of a system comprising a plurality of host computers, the graphics configuration specifying a total number of vGPU-enabled graphics processing units (GPUs) installed in the plurality of host computers in the system and a virtual machine arrival rate for an arrival queue of the system;

determine that an existing run queue of a vGPU-enabled GPU of the system matches the vGPU profile of the virtual machine;

receive, by the scheduler service, data specifying a plurality of pre-existing virtual machines in the existing run queue of the VGPU-enabled GPU of the system;

select, by the scheduler service, the particular one of the trained assignment algorithms that is correlated, by the data structure, with at least one of: the total number of vGPU-enabled GPUs and the virtual machine arrival rate specified by the graphics configuration of the system;

suspend, by the scheduler service, a particular one of the plurality of pre-existing virtual machines in the run queue in order to free up capacity for the virtual machine, and insert the virtual machine in a particular position in the run queue to arrange a set of virtual machines in the run queue into an updated order provided by the trained assignment algorithm that is trained to optimize the cost function; and execute the virtual machine and the pre-existing virtual machines according to the updated order of the run queue.

15. The system of claim 14, wherein the virtual machine is assigned to the run queue further based on expected virtual machine execution time of the virtual machine, and virtual machine arrival queue wait time of the virtual machine.

16. The system of claim 14 wherein the vGPU profile is assigned to the virtual machine based on a process list of the virtual machine.

17. The system of claim 14, wherein the virtual machine is identified from another run queue of another vGPU-enabled GPU.

18. The system of claim 14, wherein the virtual machine is assigned to the run queue further based on virtual machine arrival queue wait time of the virtual machine.

19. The system of claim 14, wherein the a number of run queues of the vGPU-enabled GPU is less than a maximum number of queues.

20. The system of claim 19, wherein the instructions, when executed by the at least one processor, further cause the at least one computing device to at least: determine that the vGPU-enabled GPU supports the vGPU profile.

* * * * *